United States Patent
Beard et al.

(10) Patent No.: US 10,927,829 B2
(45) Date of Patent: Feb. 23, 2021

(54) PUMP MONITORING METHOD

(71) Applicant: Pulsar Process Measurement Limited, Worcester (GB)

(72) Inventors: Keith Victor Beard, Worcester (GB); Sang Tran, Oldbury (GB)

(73) Assignee: Pulsar Process Measurement Limited, Worcester (GB)

( * ) Notice: Subject to any disclaimer, the term of this patent is extended or adjusted under 35 U.S.C. 154(b) by 814 days.

(21) Appl. No.: 15/550,918

(22) PCT Filed: Feb. 15, 2016

(86) PCT No.: PCT/GB2016/050365
§ 371 (c)(1),
(2) Date: Aug. 14, 2017

(87) PCT Pub. No.: WO2016/132108
PCT Pub. Date: Aug. 25, 2016

(65) Prior Publication Data
US 2018/0045194 A1 Feb. 15, 2018

(30) Foreign Application Priority Data
Feb. 16, 2015 (GB) .................................... 1502578

(51) Int. Cl.
*F04B 49/02* (2006.01)
*F04B 17/03* (2006.01)
(Continued)

(52) U.S. Cl.
CPC ............... *F04B 49/02* (2013.01); *E03F 5/22* (2013.01); *F04B 17/03* (2013.01); *F04B 49/065* (2013.01);
(Continued)

(58) Field of Classification Search
CPC ...... E21B 47/008; E21B 47/047; F04B 49/02; E03F 5/22
See application file for complete search history.

(56) References Cited

U.S. PATENT DOCUMENTS 4,778,006 A * 10/1988 Derowitsch ............ C09K 8/528
166/267
4,999,117 A * 3/1991 Palmu .................. F04D 15/0088
210/744
(Continued)

FOREIGN PATENT DOCUMENTS

EP 2297625 B1 * 11/2012 ................ E03F 5/22
EP 2297625 B1 11/2012
(Continued)

*Primary Examiner* — Manuel A Rivera Vargas
*Assistant Examiner* — Yaritza H Perez Bermudez
(74) *Attorney, Agent, or Firm* — Fox Rothschild LLP

(57) ABSTRACT

A system comprising: a reservoir (14) for holding a liquid; a pump (20) arranged to pump the liquid out of the reservoir (14) or into the reservoir (14); a level sensor (26) configured to detect the level of the liquid in the reservoir (14) and to generate level data; a current monitor (28) configured to monitor the current drawn by the pump (20) and to generate current data; and a controller (30) configured to: receive level data and determine the static head from the level data, and generate head data from the static head; receive first current and head data corresponding to the current drawn by the pump (20) as a function of the static head for a first period of operation of the pump (20); receive second current and head data corresponding to the current drawn by the pump (20) as a function of the static head for a second period of operation of the pump (20), wherein the second current and head data is recorded when the liquid in the reservoir (14) is between a first liquid level and a second liquid level, and wherein the first current and head data is recorded when the liquid in the reservoir (14) is between at least the first (Continued)

liquid level and the second liquid level; and process the first current and head data and the second current and head data to determine first difference data (PPI) representing the difference between the current drawn between the first liquid level and the second liquid level in the first period of operation and the second period of operation, the first difference data providing a pump performance indicator giving an indication of the condition of the pump.

10 Claims, 3 Drawing Sheets

(51) Int. Cl.
| | | |
|---|---|---|
| *F04B 49/06* | (2006.01) | |
| *G05B 23/02* | (2006.01) | |
| *E03F 5/22* | (2006.01) | |
| *F04D 15/00* | (2006.01) | |

(52) U.S. Cl.
CPC ..... *F04D 15/0088* (2013.01); *G05B 23/0283* (2013.01); *F04B 2203/0201* (2013.01); *F04B 2205/02* (2013.01); *F05D 2260/80* (2013.01); *F05D 2270/335* (2013.01)

(56) References Cited

U.S. PATENT DOCUMENTS

| | | | | |
|---|---|---|---|---|
| 5,342,144 A | * | 8/1994 | McCarthy | E03F 1/00 405/36 |
| 5,639,380 A | * | 6/1997 | Misquitta | B09C 1/02 210/739 |
| 5,751,599 A | * | 5/1998 | Bortnik | F28F 19/00 700/274 |
| 6,178,393 B1 | * | 1/2001 | Irvin | F04D 15/0066 700/282 |
| 8,622,713 B2 | * | 1/2014 | Hampton | F04B 49/065 417/212 |
| 10,030,502 B1 | * | 7/2018 | Singer | G01S 15/88 |
| 10,626,863 B2 | * | 4/2020 | Beard | F04B 49/065 |
| 2003/0049134 A1 | | 3/2003 | Leighton et al. | |
| 2004/0064292 A1 | * | 4/2004 | Beck | F04B 49/065 702/182 |
| 2010/0193183 A1 | * | 8/2010 | Lambie | E21B 43/12 166/250.15 |
| 2011/0077875 A1 | * | 3/2011 | Tran | E03F 5/22 702/45 |
| 2012/0040767 A1 | * | 2/2012 | Wilson | E01C 3/006 472/92 |
| 2012/0257989 A1 | | 10/2012 | Durham et al. | |
| 2012/0285896 A1 | * | 11/2012 | Black | B01D 17/047 210/741 |
| 2013/0333881 A1 | * | 12/2013 | Heller | E03B 3/08 166/250.15 |
| 2014/0009302 A1 | * | 1/2014 | Singer | G01F 25/0061 340/853.1 |
| 2014/0350856 A1 | * | 11/2014 | Lambie | G01W 1/10 702/3 |
| 2015/0047579 A1 | * | 2/2015 | Thomson | F24D 17/001 122/15.1 |
| 2017/0254687 A1 | * | 9/2017 | Heller | G01F 1/7086 |
| 2019/0176101 A1 | * | 6/2019 | Phillips | B01F 3/04262 |

FOREIGN PATENT DOCUMENTS

| | | |
|---|---|---|
| GB | 2460301 A | 12/2009 |
| JP | 2003028706 A | 1/2003 |

* cited by examiner

PUMP MONITORING METHOD

This invention relates to a system and method for monitoring the operation of one or more pumps. In particular, this invention relates to a system and method for monitoring pumps to determine degradation in the performance of pumps.

Although the present invention will be described herein with particular reference to the operation of electrically controlled pumps in a pumping station, it is not to be construed as being limited thereto.

A pumping station typically has a container for holding a liquid, such as a well, sump, holding tank or tank. In some pumping stations, there may be multiple wells or sumps. One or more pumps can be used to transfer liquids into or out of the container. For example, pumps may be used to transfer sewage out of sumps in sewage pumping stations, or to pump fresh water into holding tanks in clean water boost stations.

A typical liquid container has an inlet to admit liquid and an outlet through which the liquid is removed. Each liquid container has one or more pumps associated with the inlet or the outlet. The pumps, when activated, transfer the liquid, as required.

A single operator may have responsibility for many pumping stations, meaning the operator has responsibility for hundreds or thousands of individual pumps.

It is known to maintain and service pumps in a pumping station at regular intervals in time. However, this may result in pumps that are operating within acceptable parameters being serviced when not necessary, and faulty pumps not being maintained, thus resulting in failure.

According to a first aspect of the invention, there is provided a system. The system may comprise a reservoir for holding a liquid and a pump arranged to pump the liquid out of the reservoir to a system outlet or into the reservoir from a system inlet. The system may also comprise a level sensor configured to detect the level of the liquid in the reservoir and to generate level data. The system may further comprise a current monitor configured to monitor the current drawn by the pump and to generate current data. In addition, the system may comprise a controller. The controller may be configured to: receive level data and determine the static head from the level data. The controller may also be configured to receive first current and head data corresponding to the current drawn by the pump as a function of the static head for a first period of operation of the pump; and receive second current and head data corresponding to the current drawn by the pump as a function of the static head for a second period of operation of the pump. The second current and head data may be recorded when the liquid in the reservoir is between a first liquid level and a second liquid level, and the first current and head data may be recorded when the liquid in the reservoir is between at least the first liquid level and the second liquid level. The controller may also be configured to process the first current and head data and the second current and head data to determine first difference data representing the difference between the current drawn between the first liquid level and the second liquid level in the first period of operation and the second period of operation. The first difference data provides an pump performance indicator giving an indication of the condition of the pump.

The performance of a pump can degrade with use, due to, for example, wear in bearings, wear in the impeller and build-up of deposits in the pump or connecting pipes. The pump performance indicator is advantageous because it allows the performance a pump to be easily monitored, in a continuous and automated fashion, and provides a reliable indicator of the condition of the pump. This allows an operator of the pump to predict when maintenance is required. Because the indicator is based on the current drawn as a function of the head over a period, rather than at a single point in time, it provides a more complete picture of the pump performance. The impact of temporary effects, for example from temporary blockages, is minimised, meaning that a pump is not highlighted as requiring maintenance when it does not need it. The pump performance indicator is also useful where there are multiple pumps in one location, because it enables differentiation between the performance of the different pumps.

According to a second aspect of the invention, there is provided a system configured for installation in a reservoir for holding liquid. The system may comprise a level sensor that may be configured to be installed in the reservoir and may be configured to, in use, monitor the liquid level in the reservoir and generate level data based on the monitored liquid level. The system may also comprise a current monitor that may be configured to be installed with a pump associated with the reservoir, and may be configured to, in use, monitor the current drawn by the pump and generate current data based on the monitored current consumption. The system may further comprise a controller. The controller may be configured to, in use, receive level data and determine the static head from the level data. The controller may also be configured to receive first current and head data corresponding to the current drawn by the pump as a function of the static head for a first period of operation of the pump. The controller may further be configured to receive second current and head data corresponding to the current drawn by the pump as a function of the static head for a second period of operation of the pump. The second current and head data may be recorded when the liquid in the reservoir is between a first liquid level and a second liquid level, and the first current and head data may be recorded when the liquid in the reservoir is between at least the first liquid level and the second liquid level. The controller may further be configured to process the first current and head data and the second current and head data to determine first difference data representing the difference between the current drawn between the first liquid level and the second liquid level in the first period of operation and the second period of operation. The first difference data provides an pump performance indicator giving an indication of the condition of the pump.

According to a third aspect of the invention, there may be provided a controller configured to implement the system of the first aspect or the second aspect.

According to a fourth aspect of the invention, there may be provide a computerised method. The method may comprise the step of measuring the current drawn by a pump operating in a reservoir during a first period of operating of the pump, the pump arranged to pump the liquid out of the reservoir to a system outlet or into the reservoir from a system inlet. The method may also comprise measuring the liquid level in the reservoir during the first period of operation of the pump. The method may also comprise the step of, based on the measured liquid level, determining the static head of the reservoir during the first period of operation. The method may further comprise generating first current and head data, corresponding to the current drawn by the pump as a function of the static head for the first period of operation of the pump. The method may also comprise measuring the current drawn by the pump during a second period of operating of the pump. The method may also comprise measuring the liquid level in the reservoir during the second period of operation of the pump. The method may also comprise the step of, based on the measured liquid level, determining the static head of the reservoir during the second period of operation. The method may comprise generating second current and head data, corresponding to the current drawn by the pump as a function of the static head for the second period of operation of the pump, wherein the second current and head data is recorded when the liquid in the reservoir is between a first liquid level and a second liquid level, and wherein the first current and head data is recorded when the liquid in the reservoir is between at least the first liquid level and the second liquid level. The method may further comprise processing the first current and head data and the second current and head data to determine first difference data representing the difference between the current drawn between the first liquid level and the second liquid level in the first period of operation and the second period of operation. The first difference data provides an pump performance indicator giving an indication of the condition of the pump.

According to a fifth aspect of the invention, there is provided a machine readable medium containing instructions which when executed by a processing apparatus cause that processing apparatus to perform the method of the fourth aspect, or make the processing apparatus function as the system of the first or second aspect, or the controller of the third aspect.

The machine readable medium referred to in any of the above aspects of the invention may be any of the following: a CDROM; a DVD ROM/RAM (including -R/-RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects of the invention may be applied, mutatis mutandis, to any of the other aspects of the invention.

The invention will now be described, by way of example only, with reference to the accompanying drawings, in which.

Figure 1:
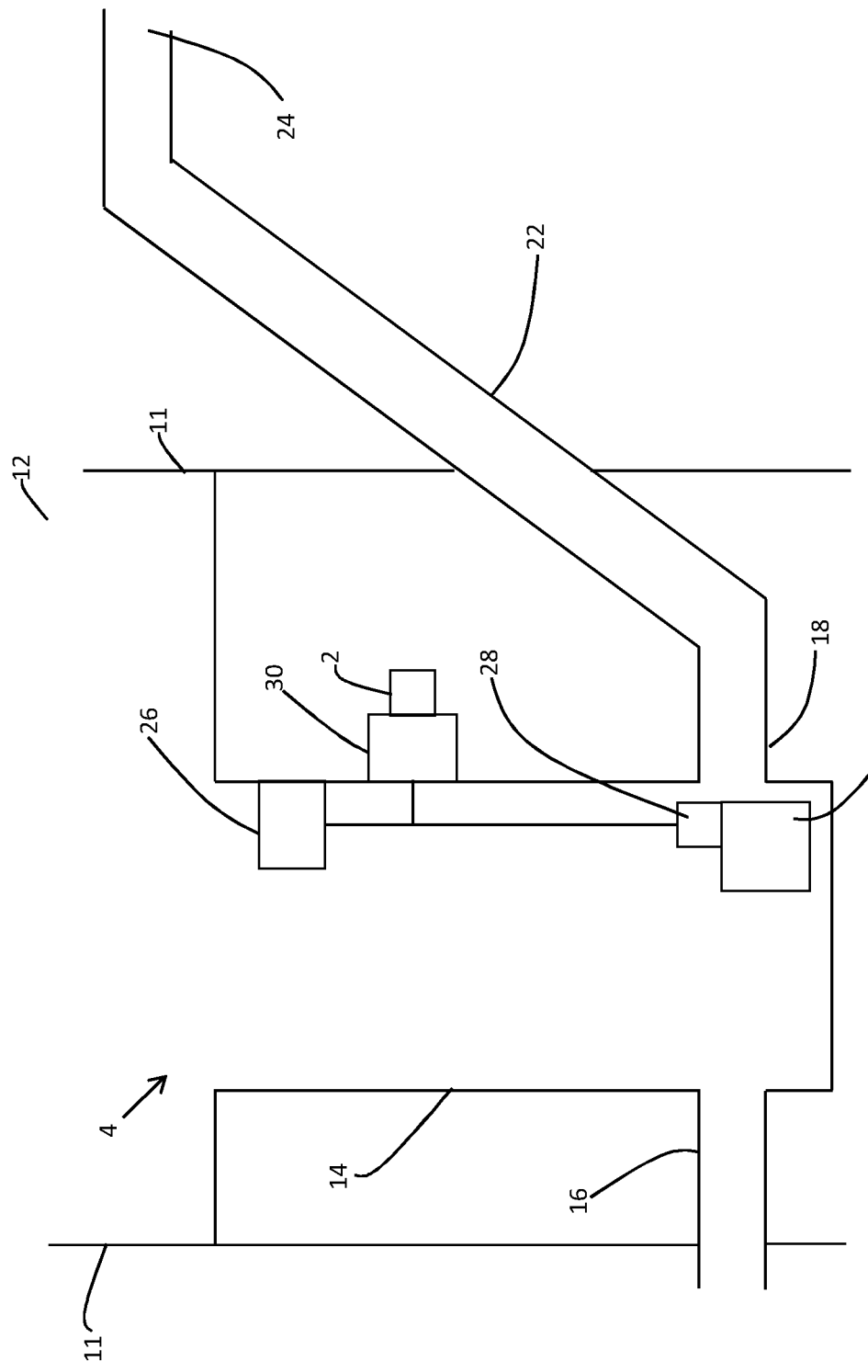
FIG. 1 is a schematic illustration of a typical sump.

FIG. 1 shows a schematic of one example of a sump 4 in a pumping station 12. The sump 4 has a reservoir 14 for holding a liquid. The reservoir 14 is fed by a reservoir inlet 16 and drained by a reservoir outlet 18. A pump 20 is provided in the reservoir 14. The pump 20 is controlled to turn on when the liquid reaches an ON liquid level and turn off when the liquid reaches an OFF liquid level.

Pipework 22 is provided to convey the liquid from the reservoir outlet 18 to a system outlet 24, outside the pumping station. This may be a final delivery point, the next pumping station 12, or the highest point to which the pumping station 12 has to pump the liquid. Similarly further pipework (not shown) also provides the liquid from a system inlet (not shown), outside the pumping station 12 to the reservoir inlet 16. The system inlet may be a source, the previous pumping station or the lowest point from which the liquid has to be pumped.

In the example, shown, the pump 20 is arranged at the reservoir outlet 18 to pump liquid out of the reservoir 14, through the pipework 22 (also known as a rising main), to the system outlet 24. In this example, the ON level is above the OFF level. This will be referred to as pumping down, and is useful in, for example, sewage pumping stations.

In other examples, the pump 20 may be arranged at the reservoir inlet 16 to pump liquid into the reservoir 14. In these examples, the ON level is below the OFF level. This will be referred to as pumping up, and is useful in, for example, fresh water supply systems.

A liquid level sensor 26 is provided to monitor the liquid level in the reservoir 14 and to output level data about the liquid level. Any suitable measuring means may be used to measure the liquid level.

A pump monitor 28 is also provided to monitor the pump 20. The pump monitor 28 may be any suitable means for monitoring the pump 20 and may be a current monitor or may include a current monitor. The current monitor measures the current drawn by the pump 20 and outputs current data. The pump monitor 28 may be connected to the controller 30 and/or the transmitter/receiver 2. Optionally, the pump monitor 28 may also include other sensors to measure further performance characteristics of the pump 20.

The liquid level sensor 26 and pump monitor 28 may be connected to a transmitter/receiver means 2, which can send data on liquid level to a central location (not shown) from which the pump can be monitored and controlled. The transmitter/receiver means 2 may also collect other information about the pump 20 or sump 4 and transmit this.

Instead of or as well as a controller at a central location, the sump 4 may include a controller 30, which is arranged to receive level measurements from the level sensor 26 and to control the pump 20 to turn on and off in the manner described above. The controllers 30 include a memory (not shown) and a processor (not shown).

The pump 20 will operate over a pumping cycle, between the pumping turning on once the liquid in the reservoir 14 has reached the ON level, and the pump turning off, once the liquid in the reservoir 14 has reached the OFF level. Each separate pumping cycle of the pump 20 is considered a separate period of operation of the pump 20.

During typical pumping down operation, the flow rate of liquid out of the reservoir 14 may exceed the flow rate of liquid into the reservoir 14 and in these examples, the liquid level will decrease. However, in some examples, the flow rate of liquid into the reservoir 14 may exceed the flow rate of liquid out of the reservoir 14 and, in these examples, the liquid level will increase. In some situations, the liquid level may increase past the ON level. When the liquid level in a reservoir that is operating in pumping down mode is increasing, various methods are known to control the pump 20 and reservoir 14 so that the liquid level decreases. For example, a second pump 20 may be turned on if the liquid level reaches a second ON level.

Similarly, in pumping up operation, the liquid level may decrease in some examples, although in normal operation, the liquid level will increase to the OFF point.

Figure 2:
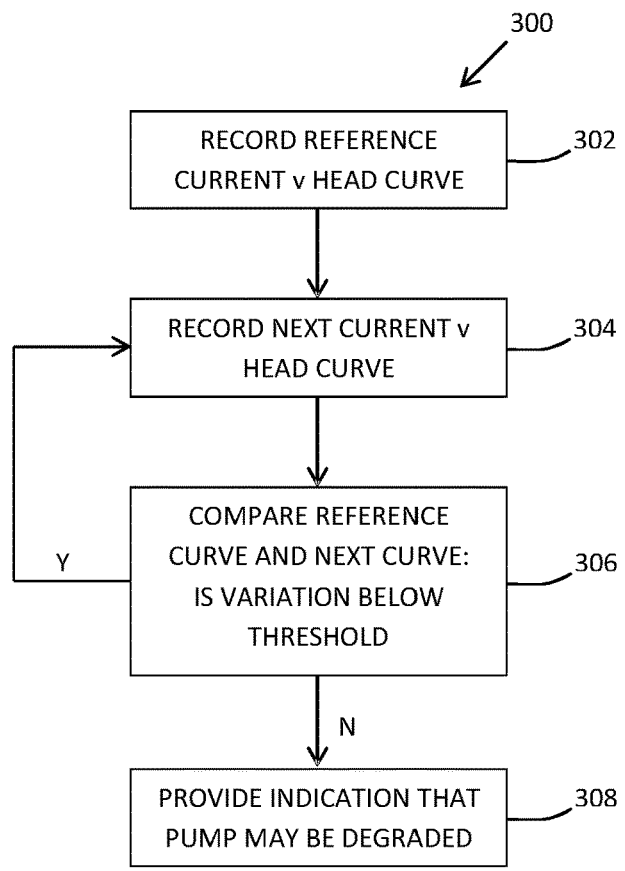
FIG. 2 shows a flow chart of a method for determining and monitoring the performance maintenance index.

FIG. 2 shows a method 300 of monitoring the condition of the pump. The method 300 is based on monitoring variations in the current consumption of the pump 20.

The method 300 starts at a first step 302, where a reference curve 400 of current consumption as a function of the static head of the reservoir 14 is measured, for a first period of operation of the pump 20.

The current is measured by the pump monitor 28. The static head is the difference between the centre line of the pump 20 and the measured liquid level in the reservoir 14. Therefore, the static head varies as the reservoir 14 is filled or emptied.

As discussed above, a pump 20 can be controlled to turn on at the ON level and turn off at the OFF level. The ON and OFF levels may be set by a user, at the one of the controllers 30, and can be set anywhere between a minimum level and a maximum level. In some examples, the minimum level is the level just before the pump 20 starts to draw air. Typically, for pumping down the OFF level is set to the minimum level. In other examples, the minimum level could be the point at which the reservoir 14 is empty. The maximum level may be the point at which the reservoir 14 starts to overflow, or may be below this point.

For the reference curve 400, the pump 20 is operated so that the pumping cycle extends over the maximum possible range of liquid levels. Once measured, the reference curve is stored as first current and head data.

At a second step 304, the current consumption curve for the next pumping cycle (the second period of pump operation) 400-2 is measured. For this pumping cycle, the pre-set ON and OFF levels are used. This curve 400-2 is stored as second current and head data.

Figure 3:
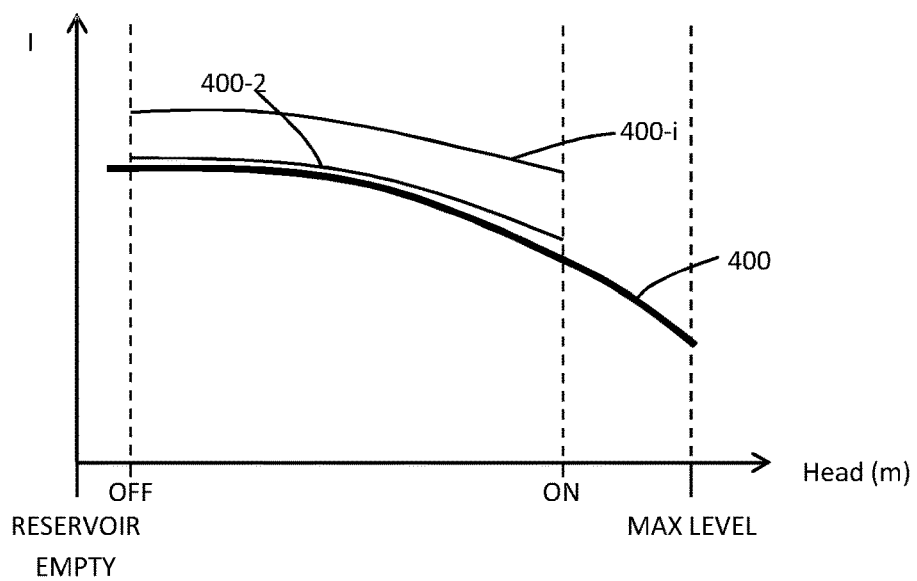
FIG. 3 shows example current and head data measured over operating cycles of the pump.

FIG. 3 shows an example of the reference curve 400 and the curve 400-2 for the next period of operation, measured in accordance with the above method. The example shown in FIG. 3 is for pumping down operation.

In a third step 306, the second current and head data is compared to the first current and head data. In one example, this can be done by simply comparing the shift between the two curves 400, 400-2 between the ON and OFF levels. In other examples, the difference between the curves between the ON and OFF levels may be determined by looking at the integrals beneath the curves. This difference is known as the pump performance indicator (PPI).

One example of PPI is:

$$PPI = \frac{\int_{OFF}^{ON} I_i dh}{\int_{OFF}^{ON} I_R dh} \%$$  (1)

Where $I_R$ is the reference curve 400, $I_i$ is the most recently measured curve 400-i.

As will be discussed below, the comparison between the data may be used to determine if the pump 20 has degraded and requires maintenance.

If the pump does not require maintenance, steps 304 and 306 are repeated for subsequent periods of operation of the pump 20, to generate further data 400-i. For each period of operation, the measured current and head data (10 is compared to the reference data ($I_R$). If the pump does require maintenance, an indication of this is provided in step 308.

In some examples, it can be determined that the pump 20 requires maintenance simply by looking at the magnitude of the shift (using the PPI or not), and determining if this is over a threshold.

Figure 4:
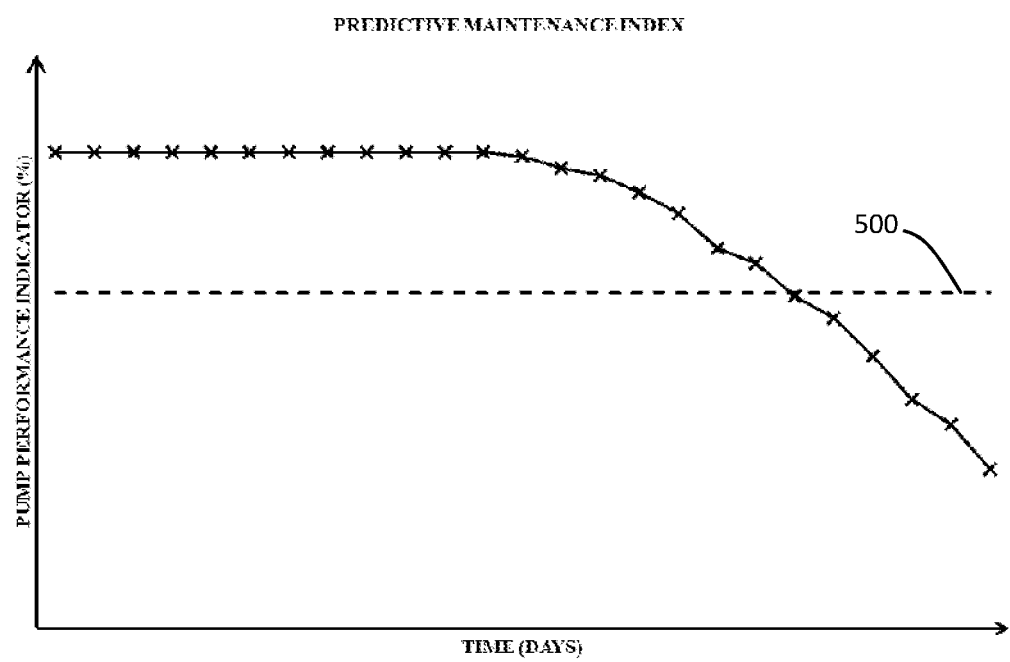
FIG. 4 shows an example of a performance maintenance index.

In other examples, the variation in PPI is plotted over time, to create the predictive maintenance index, shown in FIG. 4. PPI reduces as the pump performance degrades. Step 308 may be carried out as soon as the PPI drops below the threshold or once the PPI has been below the threshold for a certain period of time.

The message generated at step 308 may be used to schedule maintenance of the pump. Alternatively, the variation in PPI could be used to predict when the PPI will drop below the threshold 500, and to schedule maintenance before this.

The pump 20 may be controlled to stop operation when the message has been generated (for example, a second pump 20 operating in the reservoir may be used), may continue operation, or may be controlled to operate as, for example, a backup pump, until it has been services or replaced.

It will be appreciated that any suitable function may be used to derive PPI. The above function is simply chosen since it provides a reduction in PPI as the performance degrades, and provides a percentage value. In some examples, the PPI may increase as the pump degrades, and an error is detected when PPI increases above a threshold.

It will also be appreciated that a pump may perform any number of cycles over a day, and it may take a large number of days before there is any change in the PPI, let alone a degradation below the threshold 500. Therefore, in some examples, the predictive maintenance index may be plotted using an average PPI. The average PPI may be determined for a day, or any other period of time.

The reference curve 400 should be recorded when it is clear that the pump 20 is operating normally. For example, the reference curve may be measured after installation, commissioning or servicing of the pump 20. If there has been a failure of the pump 20, or the pump has required maintenance, the reference curve should be re-recorded.

This can be done by, for example, a user setting a flag at either controller, the flag indicating that at the next pumping cycle, the method should restart from step 302.

Where there are multiple pumps 20 operation in a single reservoir, the current and/or current and head data may be averaged over all pumps or taken for each pump 20 individually and that the method 300 may be performed partially or wholly at the controller 30 at the sump or at the controller at the central location.

It will be appreciated that neither the reference curve nor the subsequent curves have to be recorded over the whole operating range of the pump. Instead, the curves may be recorded over a subsection of the pumping cycle, provided that the reference curve 400 is measured over the same or a broader range than the subsequent curves 400-i, so that the pump performance indicator can be determined over the entire range of the subsequent curves 400-i. In other example, the pump performance indicator may be determined over any range where the subsequent curves 400-i overlap the reference curve 400.

It will also be appreciated that the current may be plotted against the liquid level instead of the head, and pump parameters other than current may be used.

Furthermore, in addition to comparing the most recently measured curve to the reference curve, the other curves may all be compared to each other.

FIG. 2 is for illustrative purposes only, and are not drawn to scale. Similarly, the data shown in FIGS. 3 and 4 is also for illustrative purposes only, and is not to scale. In FIGS. 2 to 4, certain features or parts of the drawing may be enlarged to better illustrate what is being described.

The above examples have been described in terms of reservoirs and sumps. However, it will be appreciated that these terms may be used to refer to any suitable containers for holding liquids in pumping stations and the like.

The invention claimed is:
1. A system comprising:
 a level sensor configured to be installed in a reservoir for holding liquid, the level sensor configured to monitor a liquid level in the reservoir and generate level data based on a monitored liquid level;

a current monitor configured to monitor the current drawn by a pump associated with the reservoir and generate current data based on a monitored current consumption; and a controller configured to:

receive the level data and determine a static head from the level data;

receive first current and head data corresponding to the current drawn by the pump as a function of the static head for a first period of operation of the pump;

receive second current and head data corresponding to the current drawn by the pump as a function of the static head for a second period of operation of the pump, wherein the second current and head data is recorded when the liquid in the reservoir is between a first liquid level and a second liquid level, and wherein the first current and head data is recorded when the liquid in the reservoir is between at least the first liquid level and the second liquid level; and process the first current and head data and the second current and head data to determine first difference data representing the difference between the current drawn between the first liquid level and the second liquid level in the first period of operation and the second period of operation, the first difference data providing a pump performance indicator giving an indication of the condition of the pump.

2. The system of claim 1, wherein the controller is further configured to, for each subsequent period of operation of the pump:

receive subsequent current and head data corresponding to the current drawn by the pump as a function of the static head for the subsequent period of operation of the pump, wherein the subsequent current and head data is recorded between the first liquid level and the second liquid level; and process the first current and head data and the subsequent current and head data to determine subsequent difference data representing the difference between the current drawn between the first liquid level and the second liquid level in the first period of operation and the subsequent period of operation.

3. The system of claim 2, wherein the controller is further configured to, for each subsequent period of operation of the pump:

process the first difference data and all subsequent difference data to determine and update performance data, representative of a variation in the difference data as a function of period of operation.

4. The system of claim 3, wherein the controller is further configured to:

process performance data to determine if a performance has dropped below a threshold; and if performance has dropped below a threshold, provide an indication that the pump requires maintenance.

5. The system of claim 1, wherein the first liquid level and the second liquid level can take any value between a minimum level and a maximum level, wherein the controller is further configured to:

for the first period of operation, control the pump to turn on at one of the maximum level or minimum level, and to turn off at the other of the maximum level or minimum level, the first current and head data being measured between the pump turning on and the pump turning off.

6. The system of claim 5, wherein the controller is further configured to:

for the second and subsequent periods of operation, control the pump to turn on when the liquid in the reservoir is at the first liquid level and to turn off when the liquid in the reservoir reaches the second liquid level.

7. The system of claim 1, wherein the first liquid level is higher than the second liquid level.

8. The system of claim 1 including the reservoir and the pump, wherein the pump is arranged to pump liquid out of the reservoir or into the reservoir.

9. A computerised method comprising:

measuring a current drawn by a pump operating in a reservoir during a first period of operation of the pump, the pump arranged to pump the liquid out of the reservoir to a system outlet or into the reservoir from a system inlet;

measuring a liquid level in the reservoir during the first period of operation of the pump;

based on the measured liquid level, determining a static head of the reservoir during the first period of operation;

generating first current and head data, corresponding to the current drawn by the pump as a function of the static head of the reservoir during the first period of operation of the pump;

measuring a current drawn by the pump during a second period of operating of the pump;

measuring a liquid level in the reservoir during the second period of operation of the pump;

based on the measured liquid level, determining a static head of the reservoir during the second period of operation;

generating second current and head data, corresponding to the current drawn by the pump as a function of the static head of the reservoir during the second period of operation of the pump, wherein the second current and head data is recorded when the liquid in the reservoir is between a first liquid level and a second liquid level, and wherein the first current and head data is recorded when the liquid in the reservoir is between at least the first liquid level and the second liquid level; and processing the first current and head data and the second current and head data to determine first difference data representing the difference between the current drawn between the first liquid level and the second liquid level in the first period of operation and the second period of operation, the first difference providing an pump performance indicator data giving an indication of the condition of the pump.

10. A non-transitory machine readable medium containing instructions executed by a processing apparatus cause that processing apparatus to perform the method of claim 9.

* * * * *